United States Patent [19]

Perten et al.

[11] Patent Number: 4,790,320
[45] Date of Patent: Dec. 13, 1988

[54] PARALLEL ULTRASONIC INFORMATION PROCESSING

[75] Inventors: Herbert Perten, Pomona, N.Y.; Ralph Scallion, Durham, N.C.

[73] Assignee: Johnson & Johnson Ultrasound Inc., New Brunswick, N.J.

[21] Appl. No.: 589,973

[22] Filed: Mar. 15, 1984

[30] Foreign Application Priority Data

Mar. 18, 1983 [GB] United Kingdom ............... 8307654

[51] Int. Cl.⁴ ............................................. A61B 10/00
[52] U.S. Cl. ................................. 128/661.01; 73/626
[58] Field of Search ..................... 128/660; 73/626; 364/724, 715

[56] References Cited

U.S. PATENT DOCUMENTS

| | | | |
|---|---|---|---|
| 4,080,660 | 3/1978 | Constant | 364/715 |
| 4,105,018 | 8/1978 | Greenleaf et al. | 128/660 |
| 4,116,229 | 9/1978 | Pering | 128/660 |
| 4,140,022 | 2/1979 | Maslak | 73/626 |
| 4,208,916 | 6/1980 | Thomenius et al. | 128/660 |
| 4,254,662 | 3/1981 | Kuroda et al. | 73/626 |
| 4,345,324 | 8/1982 | Smitt | 179/175.2 R |
| 4,435,823 | 3/1984 | Davis et al. | 364/724 |
| 4,438,464 | 3/1984 | Odaka | 360/13 |
| 4,471,785 | 9/1984 | Wilson et al. | 128/660 |

Primary Examiner—Ruth S. Smith
Attorney, Agent, or Firm—W. Brinton Yorks, Jr.

[57] ABSTRACT

Apparatus for the parallel processing of ultrasonic information to derive simultaneously multiple vectors of ultrasonic information per ultrasonic transmission. In a preferred embodiment, the apparatus includes for each transducer element in a transducer array an analog to digital converter and a delay processing subsystem associated with each analog to digital converter. Each delay processing subsystem includes means for applying a main delay time period to each received digitized signal and a first and a second incremental time delay means for delaying by some additional incremental time period the digitized main delay signal. The output of each first incremental delay means of all of the delay processing subsystems is applied to a first summing network to produce a first vector of time synchronized echo information and, simultaneously, the output of each of the second incremental delay means of each delay processing subsystem is applied to a second summing network which produces a second vector of time synchronized echo information.

6 Claims, 5 Drawing Sheets

PARALLEL ULTRASONIC INFORMATION PROCESSING

This invention relates to ultrasonic diagnostic systems and, in particular, to the parallel processing of ultrasonic information to derive multiple vectors of ultrasonic information.

In ultrasonic diagnostic systems, a beam of ultrasonic waves is transmitted into the body of a patient. The ultrasonic energy is reflected in the form of echoes from tissue interfaces in the body. These echoes are detected by one or more transducers and converted into electronic signals. The signals are processed and the times of arrival of the echoes used to recreate an image of the patient's tissue.

Multiple transducers may be used for the transmission and reception of ultrasonic energy, and may be constructed in the form of a linear array. The echo information received by the individual transducers in the array is then summed to develop information for display. The array may be electronically "steered" by passing the echo information through different delay paths for the respective transducers prior to signal summing, with the magnitudes of the delays being inversely related to the path lengths from the transducers to the area in the body being imaged. Through this "steering" technique, areas of the body at differing angles from the plane of the transducer array may be imaged.

Conventionally, the transducers will transmit one beam of energy and receive the echo information through a first combination of delays. The delayed information is then combined to produce a line or vector of information at a first angle relative to the plane of the transducer array. The delays are then changed and a second beam transmitted to produce a second vector at a second angle. A plurality of these vectors may be combined to form an image plane of the tissue on a display.

The same result may be achieved by passing the echo information received from one transmission through two sets of delay paths simultaneously. The delayed signals are then combined by two summing networks to produce two lines or vectors in parallel. A plurality of such sets of delay paths and summing networks may be used to produce a plurality of lines simultaneously, which will allow the creation of more detailed images at higher speed than will the conventional technique.

Because the parallel processing technique requires the use of a plurality of delay paths and summing networks, the hardware costs of implementing the technique can be relatively high. Accordingly, it is desirable to be able to process echo information for the production of simultaneous vectors in a manner which efficiently uses a minimal amount of circuitry.

In accordance with the principles of the present invention, a parallel ultrasonic data processing system is provided in which ultrasonic echo information is digitized and delayed in time by a main delay element. The delayed information is then applied to parallel incremental delay paths which produce simultaneous ultrasound vectors exhibiting independent delay characteristics. In a first embodiment, a dual ported memory is used to provide the incremental delays to simultaneously produce two vectors of information with independent delay characteristics. In a second embodiment, echo information is applied to a shift register, which is selectively tapped to provide two vectors of information with differing incremental delay characteristics.

Figure 1:
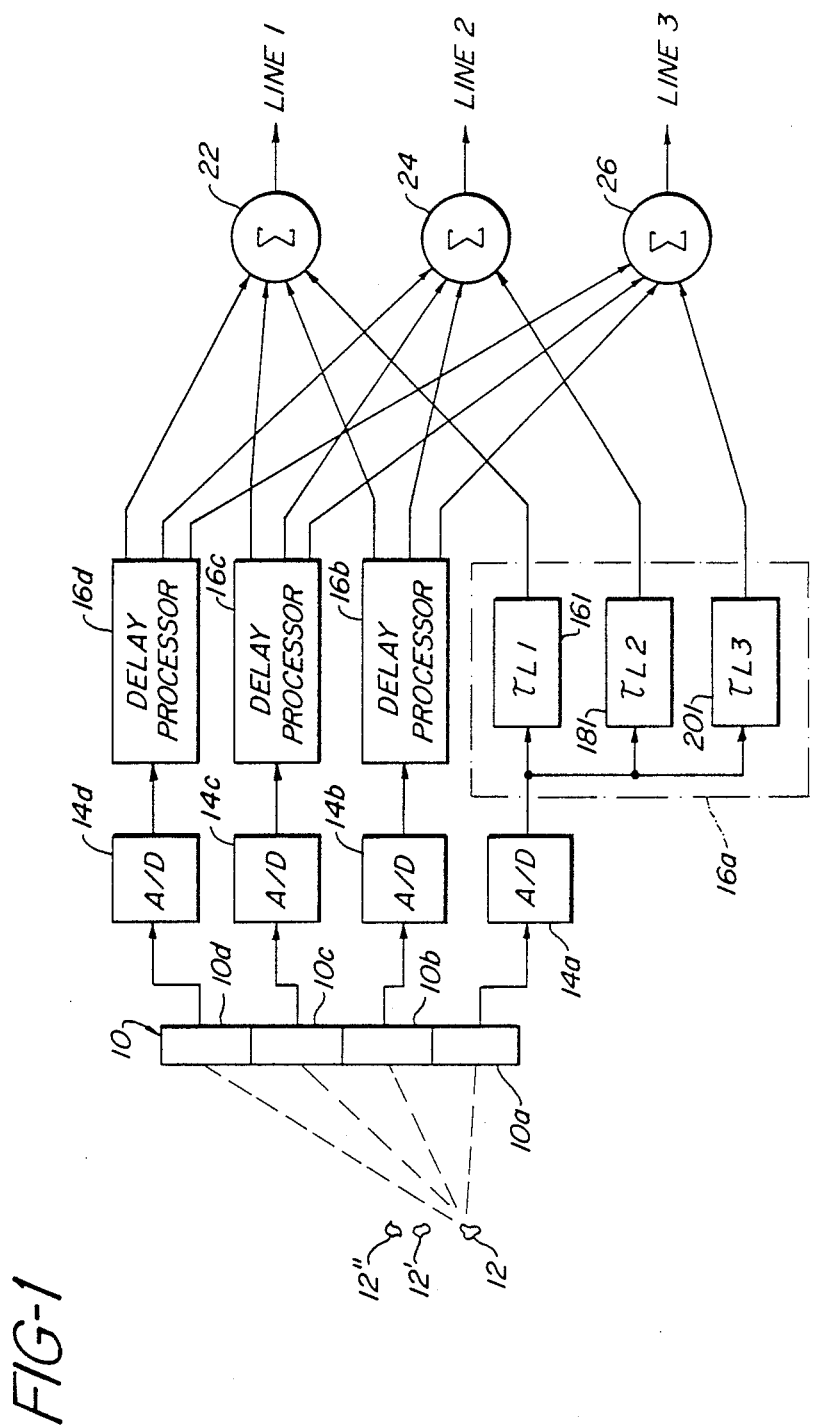
FIG. 1 illustrates in block diagram form a parallel ultrasonic data processing system.

Referring first to FIG. 1, a system for parallel processing ultrasonic information is shown in block diagram form. A linear array 10 of ultrasonic transducers is shown, including individual transducer elements 10a, 10b, 10c, and 10d. The array 10 is imaging a point 12, which is separated from each element of the array by a respectively different path length, as indicated by the dotted lines. In order to compensate for these differing path lengths, echoes received by the individual elements from point 12 must be delayed so that they arrive at the output of a summing network at the same time. This is accomplished by delaying signals from element 10a, which has the shortest path length, by a delay which is longer than the delays imparted to the other signals from the remaining elements. Signals from element 10d, which is separated by the greatest path length from point 12, will not be delayed at all or delayed by the shortest amount in this example.

Through parallel processing, one or more points such as shown as 12' and 12" are simultaneously imaged by providing parallel delay paths for echoes from these different points. Singals from the array elements 10a–10d are converted to digital signals by corresponding analogue to digital (A/D) converters 14a–14d. The digital signals from the four A/D converters are applied to corresponding four delay means such as delay processors 16a–16d, with delay processor 16a shown in greater detail than the others in FIG. 1. Signals from A/D converter 14a are applied to, for example, three delay lines 161, 181, and 201. Delay line 161 delays the digital information by a first period $\tau L1$, and the delayed information is applied to a processor such as summing network 22 for the reconstruction of line 1. Similarly, delay lines 181 and 201 delay the digital information by delay periods $\tau L2$ and $\tau L3$ and apply the delayed signals to processors such as summing networks 24 and 26, respectively. In the same manner, the other delay processors apply delayed signals to the three summing networks 22, 24, and 26. The summing networks combine the appropriately delayed signals to produce reconstructed line vectors identified as line 1, line 2, and line 3. The three line vectors may thus correspond to the imaging of lines including points 12, 12' and 12".

In general, to produce each line vector requires one independent line of time delayed digital information corresponding to each transducer element. Thus, to process two reconstructed line vectors simultaneously from one ultrasonic transmission requires two summing networks each collecting one delayed signal corresponding to information detected from each element in the transducer array.

Figure 2:
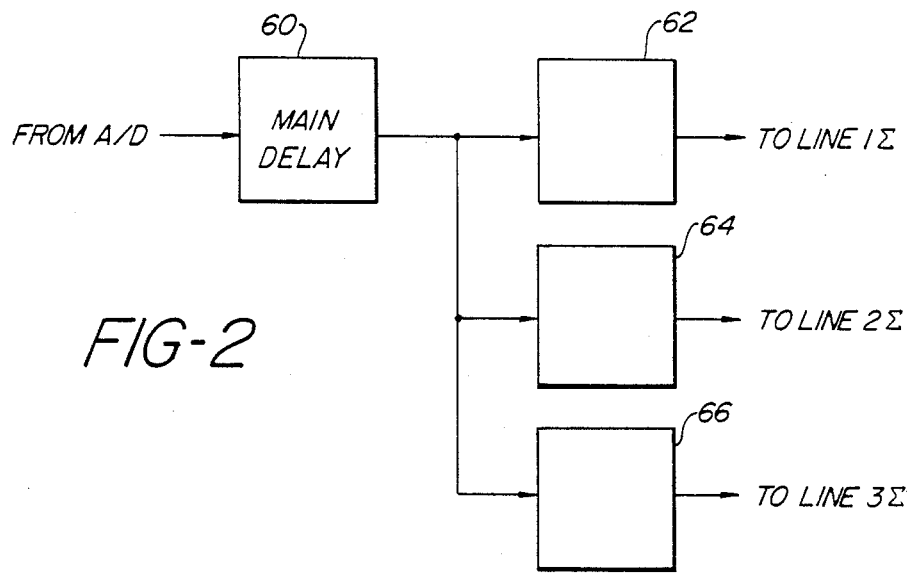
FIG. 2 illustrates in block diagram form a parallel ultrasonic data processing system using a main delay and individual incremental delays in accordance with the principles of the present invention.

Referring to FIG. 2, a technique for partitioning the delays in a parallel ultrasonic processing system is shown in block diagram form. Echo information words from an A/D converter are applied to a main delay element 60. The main delay element 60 delays the applied data words by a relatively large amount of time, which time period is the largest amount of delay which is common to all of the parallel processed lines. The output of the main delay element 60 is coupled to the inputs of the incremental delta delays 62, 64, and 66. Each of the delta delay elements imparts a relatively smaller additional delay to the information received from the main delay element 60 to produce three lines of information which may be delayed by different amounts. The three delayed lines of information are then applied to appropriate summers for reconstruction of the vector information.

For example, assume that the three vectors are to be delayed by 500 nsec. 550 nsec., and 600 nsec., respectively. The main delay 60 may then be set to provide 500 nsec. of delay. In this case, the delta delay element 62 will then provide no additional delay so that the line 1 information will be delayed by a total of 500 nsec. Delay elements 64 and 66 would provide 50 nsec. and 100 nsec., respectively to delay lines 2 and 3 by 550 nsec. and 600 nsec., respectively. Assume then that during the next transmission it is desirable to delay the three lines of information by 450 nsec., 500 nsec., and 550 nsec., respectively. In that case, the main delay time would be set at 450 nsec., and the incremental delay elements 64 and 66 would provide incremental delays of 50 and 100 nsec., respectively.

Figure 2A:
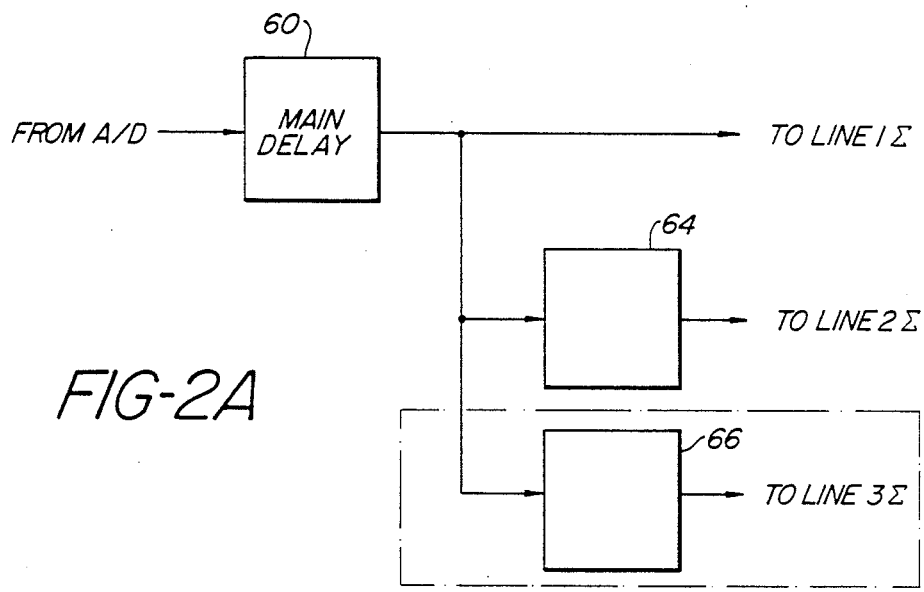
FIG. 2A is an illustration similar to FIG. 2 in which one incremental delay is eliminated.

A further simplification is illustrated in FIG. 2A wherein one incremental delay element, for example, incremental delay 62 is eliminated. In accordance with this arrangement, the output of main delay 60 is applied directly to the first summing network 22 with each remaining incremental delay 64 and 66 applied, respectively, to the succeeding summing networks 24 and 26. Thus, if only two vectors of echo information are processed in parallel, only one incremental delay is required.

Figure 3:
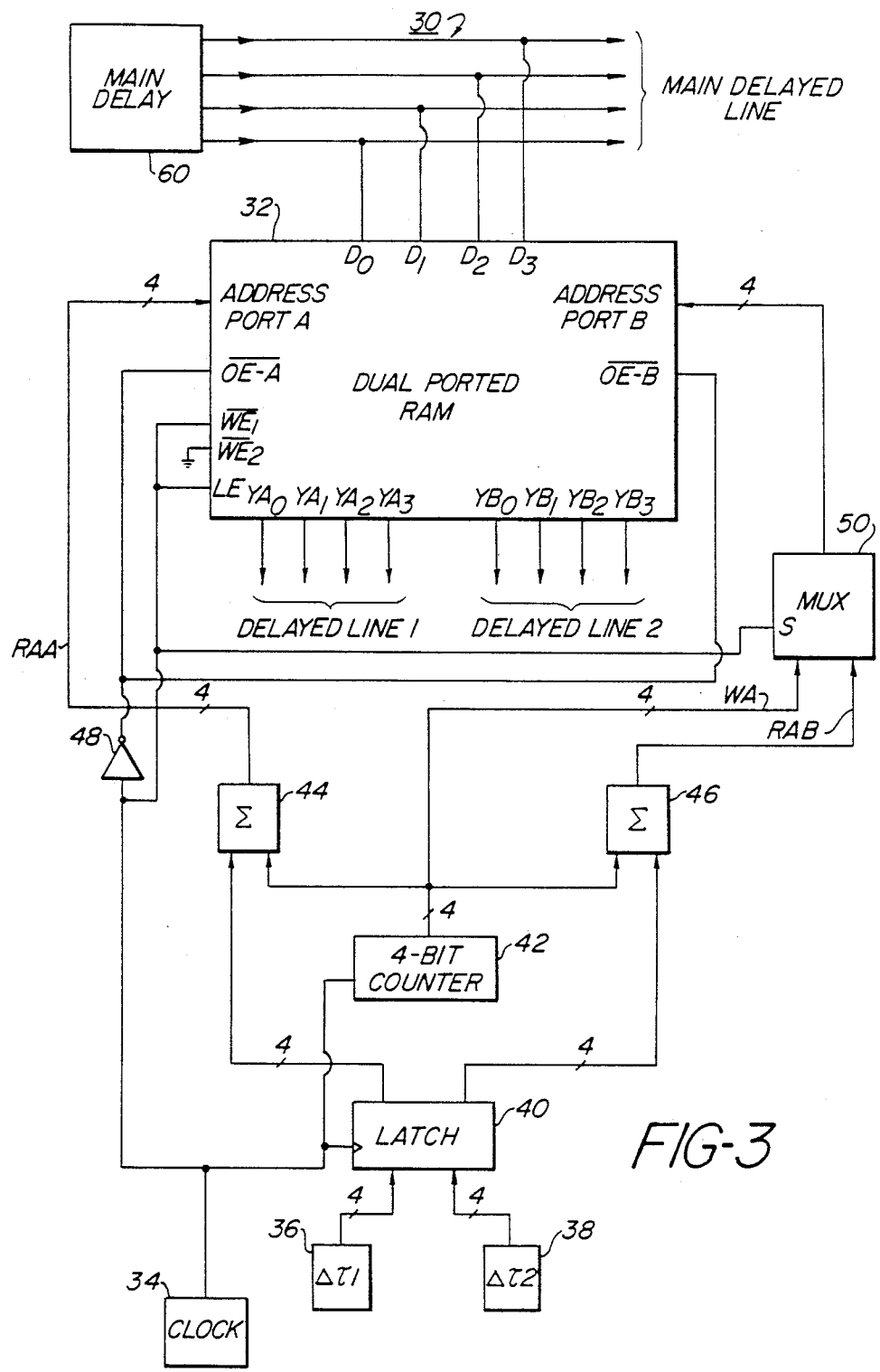
FIG. 3 illustrates in logic diagram form a parallel ultrasonic data processing system using a dual ported memory in accordance with the principles of the present invention.

Referring to FIG. 3, an arrangement using a dual ported random access memory (RAM) to simultaneously produce two lines of information which are independently delayed with respect to received line data is shown. In FIG. 3, 4-bit words from a main delay element 60 are applied to inputs of a dual ported RAM 32 from a 4-bit bus 30. The 4-bit vector words on the bus 30 represent delayed line information. The dual ported RAM 32 has two output buses which produce incrementally delayed line 1 and line 2 words, respectively.

A source of clock signals 34 applies clock signals to the clock inputs of an 8-bit latch 40 and a 4-bit counter 42. Clock signals are also applied to the input of an inverter 48, the select input of a multiplexer 50, and the write enable 1 ($\overline{WE_1}$) and latch enable (LE) inputs of the RAM 32. The output of the inverter 48 is coupled to the output enable-A ($\overline{OE\text{-}A}$) and output enable-B ($\overline{OE\text{-}B}$) inputs of the RAM 32. A source 36 of 4-bit words representing the delay of the line 1 information with respect to the line information at the input of the RAM 32 is coupled to the 8-bit latch 40, and a source 38 of 4-bit delay words for the delay line 2 information is also connected to the input of the latch 40. Outputs of the latch 40 are connected to inputs of adders 44 and 46. The output of the 4-bit counter 42 is connected to adders 44 and 46 and to one input of the multiplexer 50. The output of adder 46 is coupled to the second input of the multiplexer 50. The output of multiplexer 50 is coupled to the address port B of the RAM 32, and the output of adder 44 is coupled to the address port A of the RAM 32.

In operation, the clock signals are in synchronism with the arrival of data words from the main delay element 60. The clock signals increment the count of the 4-bit counter 42, which produces addresses of the RAM 32 into which the received line data is written. Words from the main delay element 60 are thereby written into sequential memory locations of the RAM 32. When the clock signals are low, the select line of the multiplexer 50 is low to connect the write address produced by the 4 bit counter 42, shown as WA, to the output of the multiplexer 50 and thence to address port B. Address port B is multiplexed between the read address for address port B and the write address for the RAM 32. At the same time, the low clock signal is applied to the write enable 1 and latch enable inputs of the RAM 32 to cause the data word from the main delay element 60 to be written into the RAM 32 at the write address applied to address port B.

During the second phase of the clock signal, when the signal is high, the inverter 48 applies low signals to the output enable-A and output enable-B inputs of the RAM for the production of data of the YA and YB outputs. At that time, address port A is receiving a 4-bit address which is the sum of the write address WA produced by the counter and the incremental delay $\Delta\tau 1$, which is stored by the latch 40.

At the same time, the select line of the multiplexer 50 has changed to its high state so that the output of adder 46 is connected to address port B. Address port B will thus receive a read address which is the sum of the write address WA produced by the 4-bit counter and the incremental address $\Delta\tau 2$ stored in the latch 40. The dual ported RAM 32 will thereby simultaneously read out two memory locations for the production of the delayed line 1 and delayed line 2 vector words.

For example, assume that the 4-bit counter 42 is connected so that it will count down from 15 to 0. Further assume that the $\Delta\tau 1$ value is 3, and the $\Delta\tau 2$ value is 5. Under these conditions, the 4-bit counter 42 will sequentially write words into memory locations 15, 14, 13 and so forth. When the 4-bit counter 42 is at a count of 4 to write into memory location 4, adder 44 will produce a read address A value of 4 plus 3 or 7, and adder 46 will provide a read address B value of 4 plus 5 or 9. Thus, during the clock cycle when received line data is being written into memory location 4, data stored three clock cycles previously at address 7, and five clock cycles previously at address 9, will be read out as delayed line 1 data and delayed line 2 data, respectively. The delayed line 1 and line 2 data will thus continually be separated in time from the received data by the times of 3 and 5 clock cycles, respectively.

Should it be desirable to dynamically change the delay period of either of the delayed lines with respect to the received data, which may be desired for dynamic focusing for instance, it is only necessary to change the incremental delay data words stored at 36 or 38. The new $\Delta\tau 1$ or $\Delta\tau 2$ value will then be loaded into the latch 40 during the next clock cycle and added as a new $\Delta\tau$ value to the write address WA in the respective adder.

Figure 4A:
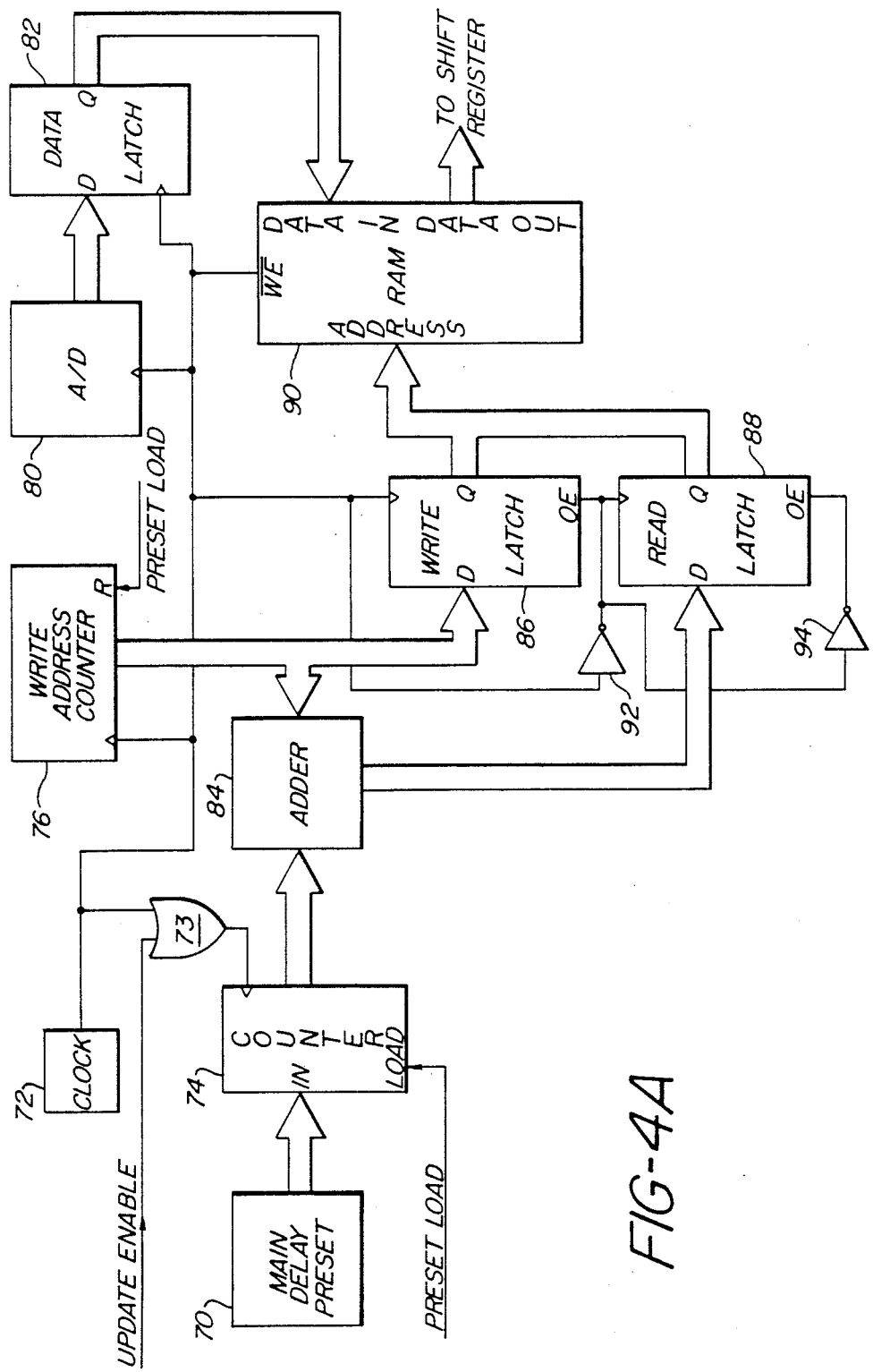
FIGS. 4A and 4B illustrate in logic diagram form a second embodiment of the arrangement of FIG. 2 in which the main delay is provided by a memory and the incremental delays are provided by a shift register.
Figure 4B:
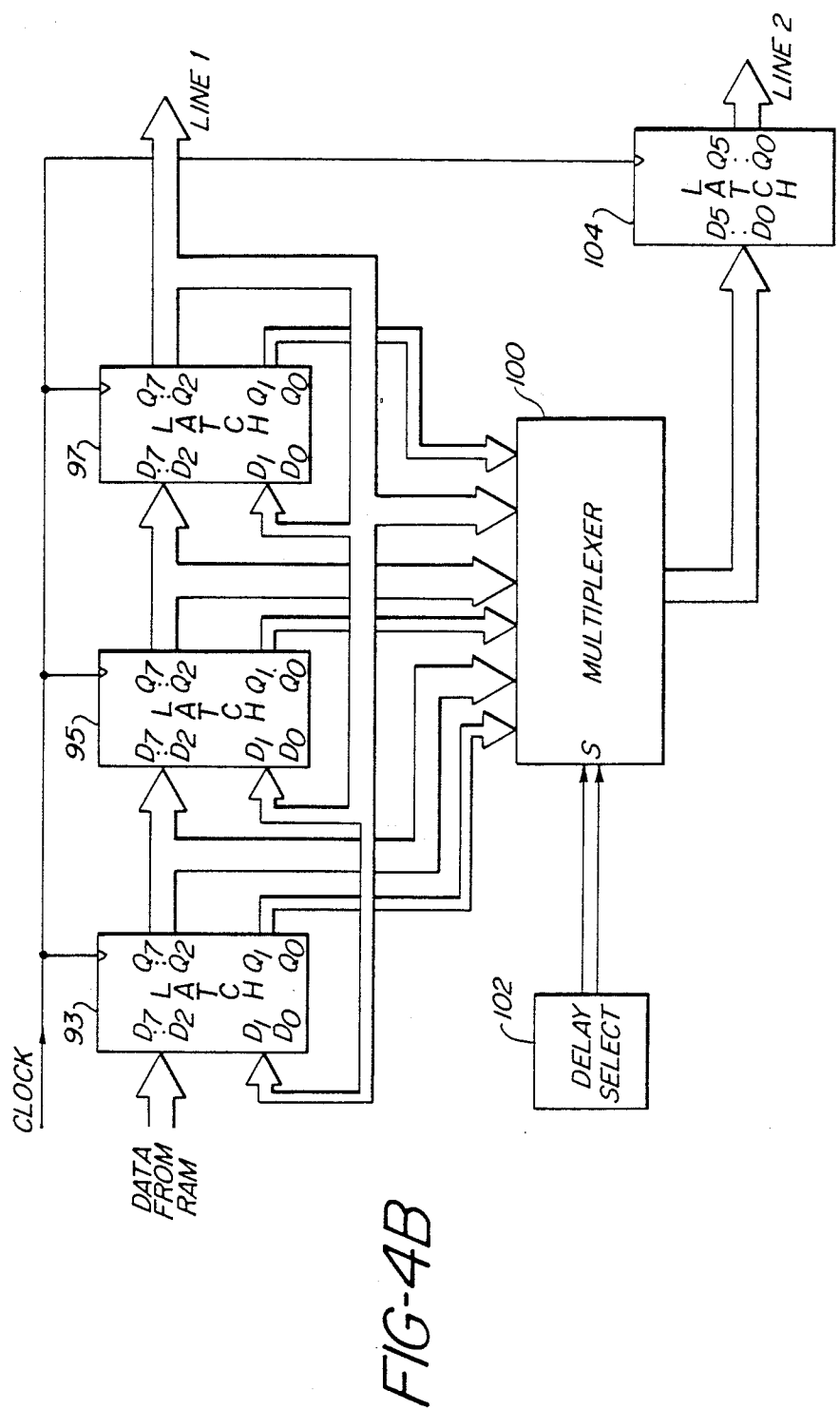

A more detailed embodiment in accordance with the principles of the arrangement of FIG. 2 is shown in FIGS. 4A and 4B. The arrangement of FIGS. 4A and 4B provides two lines of delayed vector information, each of which is delayed by the storage time of a random access memory. Additional incremental delays are provided by multiplexing the outputs of a succeeding shift register. The line 2 information may be synchronized with the line 1 information, it may precede the line 1 information by one clock cycle, or it may succeed the line 1 information in time by one or two clock cycles.

In FIG. 4A, a main delay preset register 70 contains a number representative of the time of the main delay. The main delay time is the time of the clock cycle differential between the writing of the information into the RAM and the reading out of that information from the RAM. The main delay number is applied to the preset inputs of a counter 74. A preset load signal loads this value into the counter 74. The output of the counter 74 is applied to one input of an adder 84. A write address counter 76 is reset by the preset load signal and has its output connected to a second input of the adder 84 and to the input of a write latch 86. The output of the adder 84 is coupled to the input of a read latch 88. The read and write latches 88 and 86 have tri-state outputs which are connected by way of a common bus to the address input of a RAM 90.

Ultrasonic echo information is digitized by A/D converter 80 and applied to the input of a data latch 82. The output of the data latch 82 is applied to the data input of the RAM 90. The output of the RAM 90 is coupled to the input of the shift register shown in FIG. 4B.

A source of clock signals 72 is coupled to the clock inputs of the write address counter 76, the A/D converter 80, the data latch 82, and the write latch 86. The clock signal source 72 is also coupled to one input of an OR gate 73, the other input of which receives an update enable signal. The output of OR gate 73 is coupled to the clock input of the counter 74. The clock signal is also applied to the write enable input ($\overline{WE}$) of the RAM 90 and to the input of an inverter 92. The output of the inverter 92 is coupled to the input of an inverter 94, the clock input of read latch 88, and the output enable input of the write latch 86. The output of inverter 94 is coupled to the output enable input of the read latch 88.

The preset load signal initializes the system by resetting the write address counter 76 and loading the main delay number into the counter 74. Counter 74 is operated to count down. For instance, if the write address counter is an 8-bit counter, it will count down to zero before wrapping around to 255. Thus, if a count of 156 is loaded into counter 74, the read address of the RAM 90 will constantly be 156 counts higher than the write address stored in the write latch 86, and the information produced by the RAM will be delayed by the time interval of one hundred fifty-six clock cycles.

A positive-going clock pulse decrements counter 76 to the next count and causes the A/D converter 80 to digitize a new data word. If a change in the main delay is required, as might be done for dynamic focusing, for instance, the update enable signal would enable OR gate 73 and a clock signal would increment or decrement the count of counter 74 at this time as well. The latches in FIG. 4A perform as D-type flip-flops in which data is entered when the clock signal exhibits a transition from its low state to its high state. During the positive-going transition of the clock signal the new write address is entered into the write latch 86, and a new data word is entered into the data latch 82.

Following this clock signal transition, a new data word is held in the data latch 82, and the new write address is held in the write latch 86. The clock signal goes low during its next half cycle and is applied to the write enable input of the RAM 90. The low clock signal is inverted by inverter 92 to produce a high signal at the output enable input of the write latch 86. Inverter 94 provides a low signal at the output enable input of read latch 88 at this time, so that the write address will be applied to the address input of the RAM 90. The data word held in the data latch 82 is thus written into the RAM 90 during the low condition of the clock signal.

The adder 84 adds the main delay value produced by the counter 74 to the write address produced by the write address counter 76. The adder 84 produces a read address which is entered into the read latch 88 when the clock signal goes low. When the clock signal goes high again, the output enable input of the read latch 88 receives a high signal, putting the read address on the bus at the address input of the RAM 90. Thus, when the clock signal is in a high state, data is read out of the RAM 90 from the address selected by the address held in the read latch. System operation continues in this manner, with the read address following the decrementing write address by a fixed amount until such time as the count stored in counter 74 is changed.

The delayed data words produced by the RAM 90 are applied to the shift register shown in FIG. 4B. In a constructed embodiment of the present invention, the data words are 6 bits in length and the shift register latches 93, 95, and 97 shown in FIG. 4B are 8-bit latches. In FIG. 4B, the three 8-bit latches are configured to form a four stage shift register by connecting ones of the output lines of latch 97 to the two remaining inputs of each 8-bit latch. Thus, the six-bit words from the RAM are shifted sequentially through latches 93, 95, and 97, and then in parallel in two-bit groups through the three latches, which form the fourth stage.

The four delayed signals are then applied to inputs of a multiplexer 100. The multiplexer 100 connects any one of the four differently delayed input words to its output in accordance with the value of a two bit select signal provided by a delay select register 102. The output signal of the multiplexer 100 is then retimed by clocking the output word into a further latch 104. Two delayed information lines are produced at the outputs of latches 97 and 104.

It may be seen that the line 1 information produced by latch 97 is delayed by the time increment of three clock cycles with respect to the RAM data at the input of latch 93. The line 2 information at the output of latch 104 is delayed by either 2, 3, 4, or 5 clock cycles with respect to the RAM data at the input of latch 93, in accordance with the shift register output selected by the multiplexer 100. Therefore, in this embodiment the line 2 information may precede the line 1 information by the time of one clock cycle; it may be synchronized with the line 1 information by passing through latches 93, 95, and 104; or it may be delayed with respect to the line 1 information by the time of an additional one or two clock cycles.

We claim:

1. In an ultrasonic diagnostic imaging system which transmits ultrasonic energy into the tissue of a patient and receives ultrasonic echoes reflected by the patient in response to such transmissions, apparatus for processing simultaneously more than one vector of echo information for each transmission, which comprises:

an array of transducer elements for detecting time dependent ultrasonic echo information and converting such echo information into electrical signals;

a plurality of delay means, for delaying said received electrical signals to produce a plurality of time independent delayed signals, each of said delay means including:
  (i) one main delay means, having an input coupled to receive electrical signals from a given one of said transducer elements and an output, for delaying received electrical signals by a preselected main time period; and
  (ii) at least one incremental delay means having an input coupled to the output of said main delay means and a plurality of delay means outputs, for additionally delaying said signals delayed by said main delay by some incremental time period, generally relatively small compared to the corresponding main time period, such that each of said delay means outputs produces time independent delayed signals; and at least two processing means, each coupled to receive time independent delayed signals from an output of each of said delay means so that each of said processing means produces from said time independent delayed signals a composite representing one unique vector of time synchronized echo information for each transmission.

2. In an ultrasonic system according to claim 1 wherein each of said incremental delay means includes a dual ported random access memory means for simultaneously producing two independently delayed lines of echo information corresponding to each transducer element.

3. In an ultrasonic system according to claim 1 wherein each of said main delay means includes a random access memory and each of said incremental delay means includes
a shift register means, wherein said shift register means is coupled to receive time delayed signals from said random access memory and for incrementally delaying said received signals.

4. In an ultrasonic diagnostic imaging system which transmits ultrasonic energy into the tissue of a patient and receives ultrasonic echoes reflected by the patient in response to such transmissions, apparatus for processing simultaneously more than one vector of echo information for each transmission, which comprises:
  (a) an array of transducer elements for detecting time dependent ultrasonic echo information and converting such echo information into analog signals;
  (b) a plurality of analog to digital converter, one associated with each transducer element and each coupled to receive analog signals from its associated transducer element and for digitizing said analog signals;
  (c) a plurality of delay means, one coupled to each analog to digital converter for delaying each digitized signal received from a respective analog to digital converter to produce at least two vectors of information with independent delay characteristics, each of said delay means including one main delay means for delaying each received digitized signal by a preselected main time period and at least two incremental delay means coupled to said main delay means for additionally delaying the digitized signal delayed by said main delay means by differing incremental time periods, each of said time periods being generally relatively small compared to the corresponding main time period; and
  (d) a plurality of summing networks, each coupled to receive digitized time delayed signals from one of said incremental delay means of each of said delay means so that each of said summing networks produces simultaneously one unique vector of time synchronized echo information for each transmission.

5. In an ultrasonic diagnostic imaging system which transmits ultrasonic energy into the tissue of a patient and receives ultrasonic echoes reflected by the patient in response to such transmission, apparatus for producing simultaneously more than one vector of echo information for each transmission, which comprises:
an array of receiving transducers;
a main delay having an input coupled to one of said receiving transducers and an output, and exhibiting a preselected main delay period for received signals passing between its input and output; and
means for selectively providing predetermined small amounts of incremental delay between the output of said main delay and a plurality of output terminals, wherein a plurality of differently delayed signals are simultaneously produced at said output terminals which are derived from a common signal received from said one of said receiving transducers.

6. In an ultrasonic system according to claim 5, further comprising:
a plurality of additional main delay coupled to respective ones of said receiving transducers;
a plurality of additional incremental delay means coupled respectively to ones of said additional main delays; and
a plurality of summing networks, each of which has inputs coupled to a respective one of said output terminals of ones of said incremental delay means to produce, at an output, a vector of echo information.

* * * * *